(12) United States Patent
Breed et al.

(10) Patent No.: US 7,894,349 B2
(45) Date of Patent: Feb. 22, 2011

(54) METHOD AND SYSTEM FOR TESTING CUSTOMER PREMISE EQUIPMENT DEVICES

(75) Inventors: Michael Breed, Duluth, GA (US); Kevin Walter, Sugar Hill, GA (US)

(73) Assignee: ARRIS Group, Inc., Suwanee, GA (US)

( * ) Notice: Subject to any disclaimer, the term of this patent is extended or adjusted under 35 U.S.C. 154(b) by 309 days.

(21) Appl. No.: 12/049,109

(22) Filed: Mar. 14, 2008

(65) Prior Publication Data

US 2009/0282446 A1 Nov. 12, 2009

Related U.S. Application Data

(60) Provisional application No. 60/894,867, filed on Mar. 14, 2007.

(51) Int. Cl.
*H04J 1/16* (2006.01)
(52) U.S. Cl. .................................................. 370/241
(58) Field of Classification Search ................. 370/241, 370/401

See application file for complete search history.

(56) References Cited

U.S. PATENT DOCUMENTS

| 6,480,531 | B1 * | 11/2002 | Malhotra ............... 375/222 |
| 7,016,373 | B2 * | 3/2006 | Wakayama et al. ......... 370/463 |
| 2004/0190544 | A1 * | 9/2004 | Azenko et al. ............. 370/442 |

* cited by examiner

*Primary Examiner*—Kevin C Harper
(74) *Attorney, Agent, or Firm*—Troy A. Van Aacken; Robert J. Starr

(57) ABSTRACT

A test system couples various ports of one or more CPE devices to components mounted in a rigid mounting system. The system can test the line card portion of the CPE devices coupled to line card interface equipment for various parameters. Variable RF attenuation in RF interface equipment can adjust power levels to/from the RF port of the CPE devices to account for close proximity and variations between different vendors and models, which are coupled via the RF interface equipment to an included CMTS. Network interface equipment tests network port performance of the CPE devices by coupling a general purpose computer thereto. Switching one of a plurality of CPE devices to be the only one tested at a time and switching an addition RENLOAD is controlled by a provisioning server based on criteria including information in a database of various parameters of the particular device being tested.

22 Claims, 4 Drawing Sheets

METHOD AND SYSTEM FOR TESTING CUSTOMER PREMISE EQUIPMENT DEVICES

CROSS REFERENCE TO RELATED APPLICATION

This application claims priority under 35 U.S.C. 119(e) to the benefit of the filing date of Breed, U.S. provisional patent application No. 60/894,867 entitled "Method and system for testing CPE devices," which was filed Mar. 14, 2007, and is incorporated herein by reference in its entirety.

FIELD OF THE INVENTION

This invention relates, generally, to network communication devices, and, more particularly to testing multiple CPE devices that have been returned from the field due to malfunction of apparent defect.

BACKGROUND

A cable network system operator, often referred to as a multiple systems operator ("MSO") typically provides data and telephony services over a cable modem or telephony modem that operates according to the Data Over Cable Service Interface Specification ("DOCSIS") standard and the PacketCable standard for telephony service. End users often complain that the equipment does not work properly and an MSO technician drives to a user's location, either home or office, to diagnose the problem. Often, then technician cannot determine the problem with the existing modem and replaces the existing one with a new one from his stock.

When the technician returns his or her replaced modems they are placed into a lot for further testing or shipment back to the manufacture for warranty purposes. The equipment that the MSO technician's typically use is cumbersome and often complicated, or is very limited in features and scenarios it can test. Thus, the MSO ultimately sends the modems back to the manufacturer who determines that there was nothing wrong with the devices. This process costs the manufacturer and the MSO time and money. Thus, there is a need in the art for a compact, simple-to-operate testing system that performs comprehensive testing of cable modems and telephony over cable modems. Furthermore, there is a need for a testing system that can evaluate modems from more than one manufacturer without the need for complex hardware modifications, such as changing jumpers on a circuit board, to accommodate the modems of a variety of manufacturers.

DETAILED DESCRIPTION

As a preliminary matter, it readily will be understood by those persons skilled in the art that the present invention is susceptible of broad utility and application. Many methods, embodiments and adaptations of the present invention other than those herein described, as well as many variations, modifications, and equivalent arrangements, will be apparent from or reasonably suggested by the present invention and the following description thereof, without departing from the substance or scope of the present invention.

Accordingly, while the present invention has been described herein in detail in relation to preferred embodiments, it is to be understood that this disclosure is only illustrative and exemplary of the present invention and is made merely for the purposes of providing a full and enabling disclosure of the invention. The disclosure is not intended nor is to be construed to limit the present invention or otherwise to exclude any such other embodiments, adaptations, variations, modifications and equivalent arrangements, the present invention being limited only by the claims appended hereto and the equivalents thereof.

Figure 1:
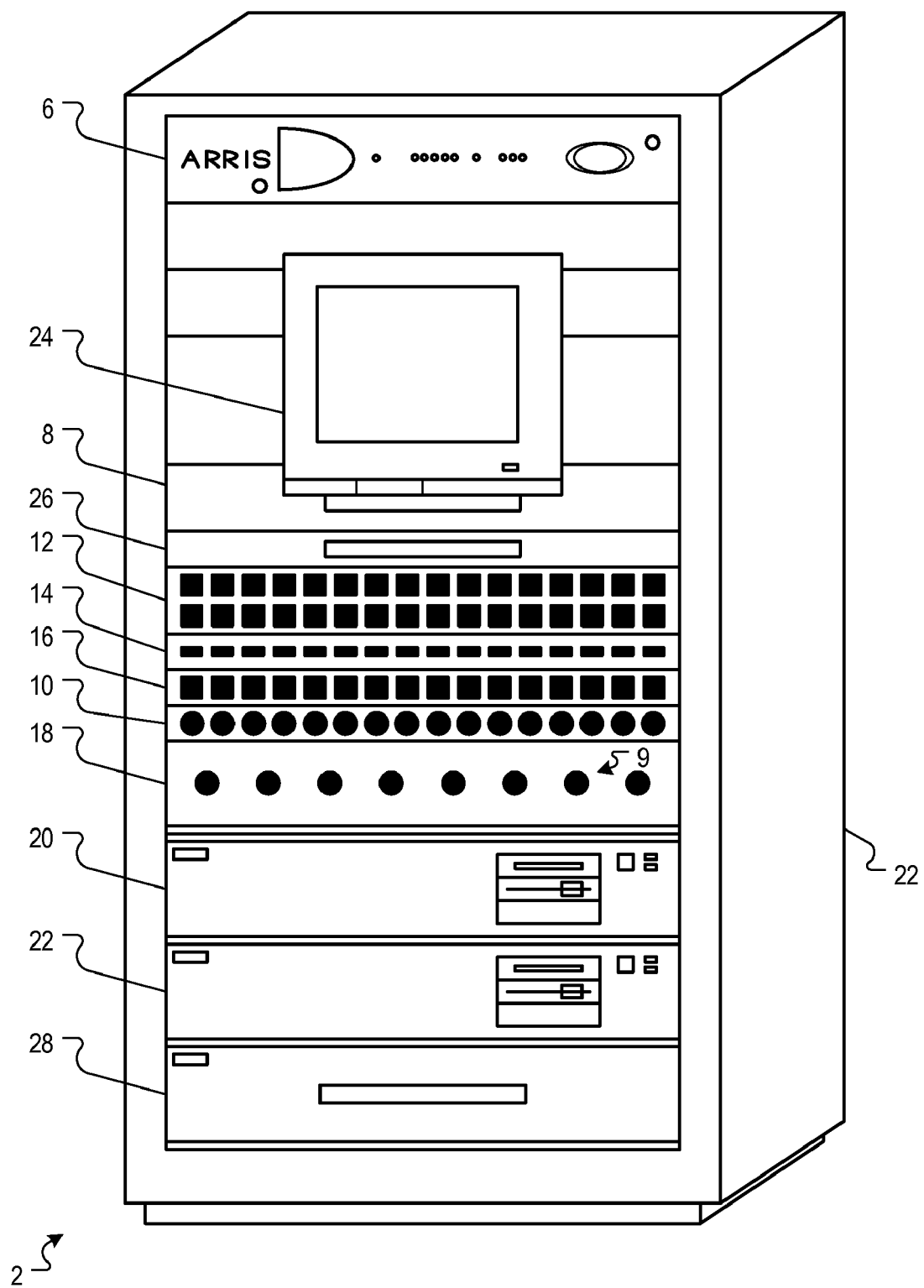
FIG. 1 illustrates a system, mounted on a rigid rack mount system, for facilitating comprehensive testing of cable modems and telephony over cable modems.

Turning now to FIG. 1, the figure illustrates a system 2 for performing comprehensive testing of a plurality of customer premise equipment ("CPE") devices, such as, for example, cable modems and telephony over cable modems. System 2 is mounted to a rigid frame or housing 4, which allows mounting of various devices and equipment that facilitates testing of the CPE devices. The equipment and devices mounted in system 4 include a cable modem termination system 6 ("CMTS"), such as, for example, a CADANT C3® sold by ARRIS Group, Inc.

Below CMTS 6 system 2 includes radio frequency interface ("RF") equipment 8, which may include RF interface port connections, such as for example, F-connectors. However, in the figure, interface F-connectors 9 are shown in a separate RF interface panel 10. line card interface equipment 12 includes a plurality of telephone jacks, such as, for example, RJ-11 jacks, for coupling to similar telephone jacks in one or more of a plurality of CPE devices being tested. It will be appreciated that line card interface equipment 12 includes telephone jacks, but could also be mounted separate from a panel that includes the telephone jacks.

Network interface 14 includes a plurality of universal serial bus ("USB") connection ports for connecting with USP connection ports of the CPE devices being tested. However, although shown separate from Ethernet interface 16, it will be appreciated that network interface 14 could include USB connection ports as well as the Ethernet connection ports, such as, for example, RJ-45 jacks, of Ethernet interface 16. Hereinafter, reference to network interface 14 will be understood to include reference to network interface 14 and Ethernet interface 16 unless otherwise noted.

Power supply panel 18 provides common household current receptacles for providing power to a plurality of CPE devices being tested. The receptacles may be individually protected and the voltage provided there from may be controllable, as is discussed later herein.

System also includes 2 also includes a general purpose computer running a common, user friendly, commercially available operating system. System 2 also includes a provisioning server computer, which runs a less common operating system, such as Linux, and which operates a variety of provisioning, operation and control signaling to some of the other components discussed above that are mounted in enclosure 4. System 2 further includes a video display for displaying information and input screens of a user interface operated by general purpose computer 20. Mounting system 4 may also include a key board tray 26 and drawer 28.

Figure 2:
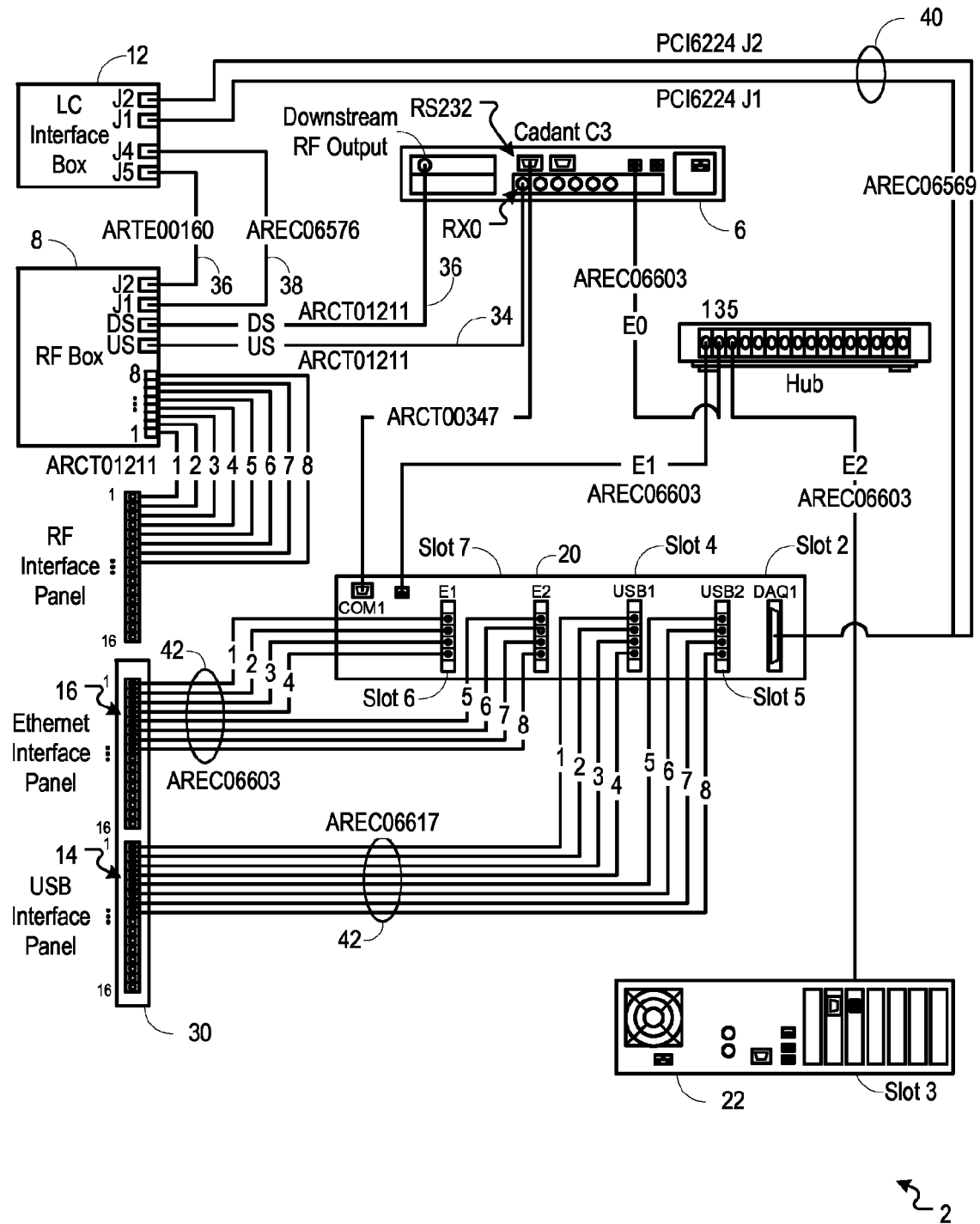
FIG. 2 illustrates a wiring diagram for a system for facilitating comprehensive testing of cable modems and telephony over cable modems.

Turning now to FIG. 2, the figure illustrates a wiring diagram for a system 2 for facilitating comprehensive testing of cable modems and telephony over cable modems. As discussed above, reference to network interface 30 includes Ethernet interface 16 and USB interface 14. Other components shown in FIG. 2 that were discussed in FIG. 1 include general purpose computer 20, provisioning server computer 22, RF equipment 8, line card interface equipment 12, CMTS 6 and RF interface 10. General purpose computer 20, CMTS 6 and provisioning server computer 22 connect to hub 32 via network connections, preferably Ethernet connections. Hub 32 may be a common Ethernet hub as known in the art.

CMTS 6 couples to general purpose computer 20 via a direct connection, such as, for example, a serial bus connection using an RS-232 port. RF interface equipment 12 couples to CMTS 6 via an upstream link 34 and a downstream link 36. These links simulate upstream and downstream links from a CMTS located at an MSO's head end facility that connect with a node on a hybrid fiber coaxial network ("HFC"). These links provide upstream and downstream RF connectivity between CMTS 6 and CPE devices being tested, which are connected to RF interface 10 via RF connections, such as coaxial cable using F-connectors. A more detailed description of RF interface equipment 8 is discussed later herein. Power is shared between RF equipment 8 and line card interface 12 via power connection 36. Digital signals are communicated between RF equipment 8 and line card interface equipment 12 via first digital connection 38 and between the RF equipment and general purpose computer via second digital connection 40.

Network signals to and from a CPE device being tested are transported through Ethernet ports mounted on interface 16 or USB ports on interface 14. Signals transported through network interface 30 are transported to and from general purpose computer 20, which simulates a user's personal computer connected to the Ethernet port or USB port of a CPE device being tested.

The digital signals communicated between LC interface equipment 12 and RF interface equipment 8 include control signals for controlling variable attenuators to regulate the RF power levels on links 34 and 36 as discussed in more detail later herein. The control signals are typically generated by provisioning server 22 and transmitted there from to general purpose computer 20 and from there over second digital link 40 and first digital link 38 to RF interface equipment 8. The control signals are typically generated in response to power levels measured on links 34 and 36 by variable attenuators in RF interface equipment 8. Signals representing the measured power levels are forwarded over first digital connection 38 and second digital link 40 to the provisioning server, which processes the measured power level of RF signals on links 34 and 36 and sends a control signal to regulate the power based on a comparison to a configuration table or database stored in provisioning server 22. Thus, provisioning server 22 can regulate RF power to/from a CPE device being tested based on its manufacturer and other parameters that may be stored in the configuration database. Network interface digital links 42 and 44 couple Ethernet interface ports 16 and USB interface ports 14 to network slots on general purpose computer 20. Thus, because both provisioning server 22 and general purpose computer 20 are coupled to hub 32, which simulates an operator's private internet protocol network, the provisioning server can be coupled via the hub to any one of a plurality of CPE being test when either their Ethernet port or USB port, or similar digital port, is coupled to any of the network interface ports 14 or 16. The general purpose computer so coupled simulates a user's personal computer coupled to the Ethernet or USP port of the CPE device, and can simulate any of the normal operations such a user computer would perform, such as, for examples, downloading information from the internet via the CPE device, or operating as a website server.

Figure 3:
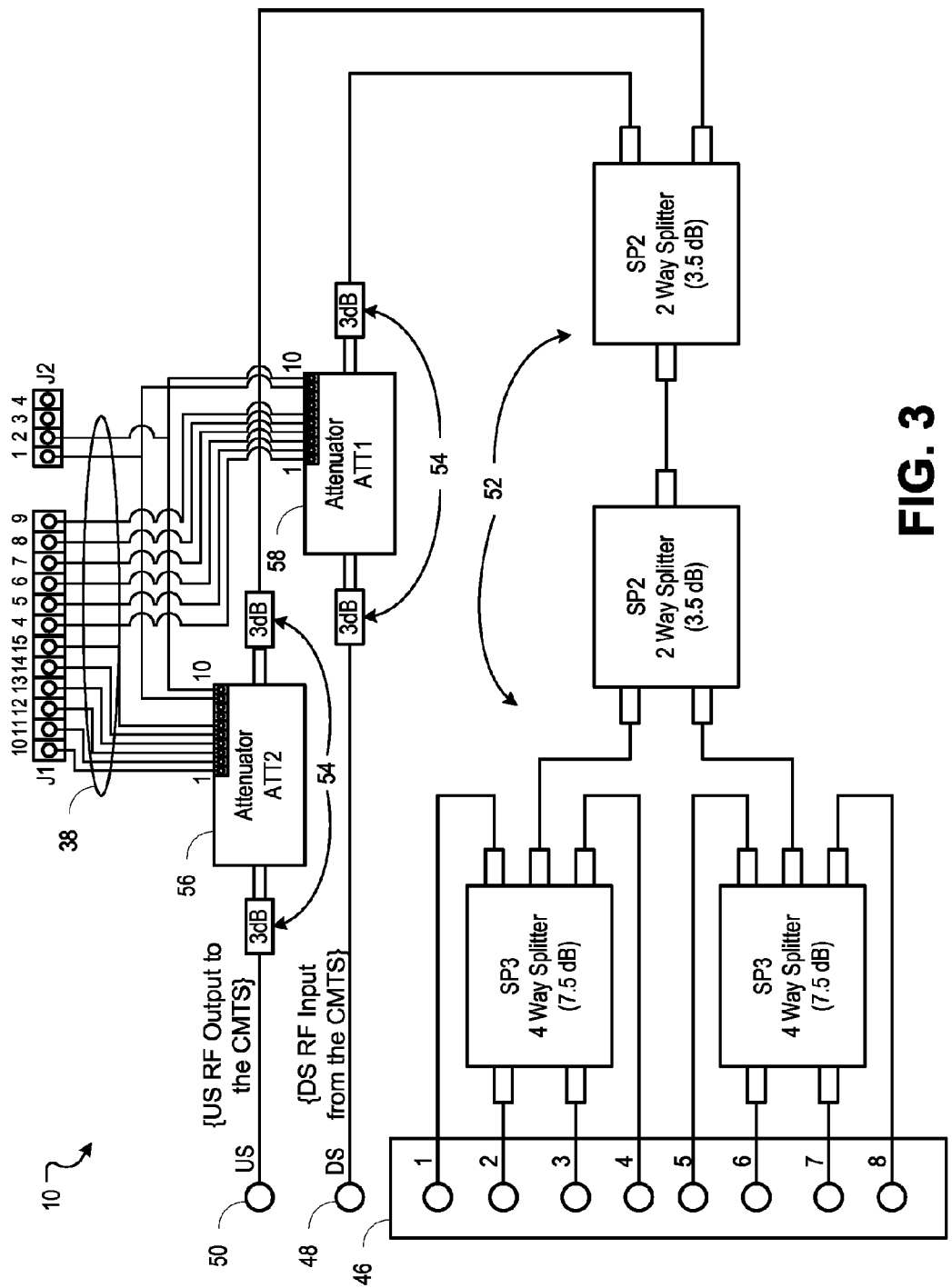
FIG. 3 illustrates a wiring diagram of RF interface equipment.

Turning now to FIG. 3, a wiring diagram of RF interface equipment 10. A plurality of RF interface ports 46, preferably F-connectors, couple links to corresponding RF interface ports on one or more CPE devices being tested. Downstream port 48 and upstream port 50 also comprise preferably F-connectors for coupling to corresponding downstream and upstream ports on CMTS 6, shown in other figures described herein. A network of splitters 52 combines/splits signals transported between the RF interface equipment 10 and the one or more of the plurality of CPE devices being tested. Fixed attenuators 54 may also be used to reduce the strength of the signals received and transmitted from ports 50 and 48 respectively.

Variable attenuators 56 and 58 receive control signals via first digital connection 38. As discussed above, first digital connection 38 connects digital communication ports of RF interface equipment 10 and LC interface equipment 12. Provisioning server 22 generates the control signals and sends them to LC interface equipment 12 over second digital connection 40, as discussed above in reference to FIG. 2. Attenuators 56 and 58 may also be capable of detecting the power level of the communication signal, or signals, present between the corresponding fixed attenuators 54. Attenuators 56 and 58 may be capable of generating a power monitor signal based on the detected power level and then transmit the power monitor signal toward provisioning server 22 via first digital connection 38. When provisioning server 22 receives the power monitor signal it generates a control signal that can cause the attenuation levels of variable attenuators 56 and 58 to change in response to the power monitor signal. This provides the advantage that electronic components, such as, for example, transistors, integrated circuits, etc., do not saturate because of high power levels. The output power levels of the CMTS in the downstream direction and the CPE devices in the upstream direction are designed to provide adequate signal to noise ratios over distances of several miles. Without the inherent attenuation of miles of cable to reduce these power levels, the RF output levels of the CMTS and the CPE devices in the test environment, where distances are only a few feet, are too high for the input circuitry of the CMTS in the upstream direction and the CPE devices in the downstream direction. Thus, the variable attenuators can be used to avoid saturation of the input circuitry due to too-high power levels. In addition to monitoring power levels with variable attenuators 56 and 58, provisioning server 22 may be programmed with a configuration file that includes the nominal power output levels of CPE devices sold by various manufacturers. Thus, the provisioning server can adjust the attenuation of variable factors in variable attenuators 56 and 58 a predetermined amount by sending a control signal to the general purpose computer, which sends the control signal information from there via second digital connection 40 toward the variable attenuators to attenuate the signals passing there through.

Figure 4:
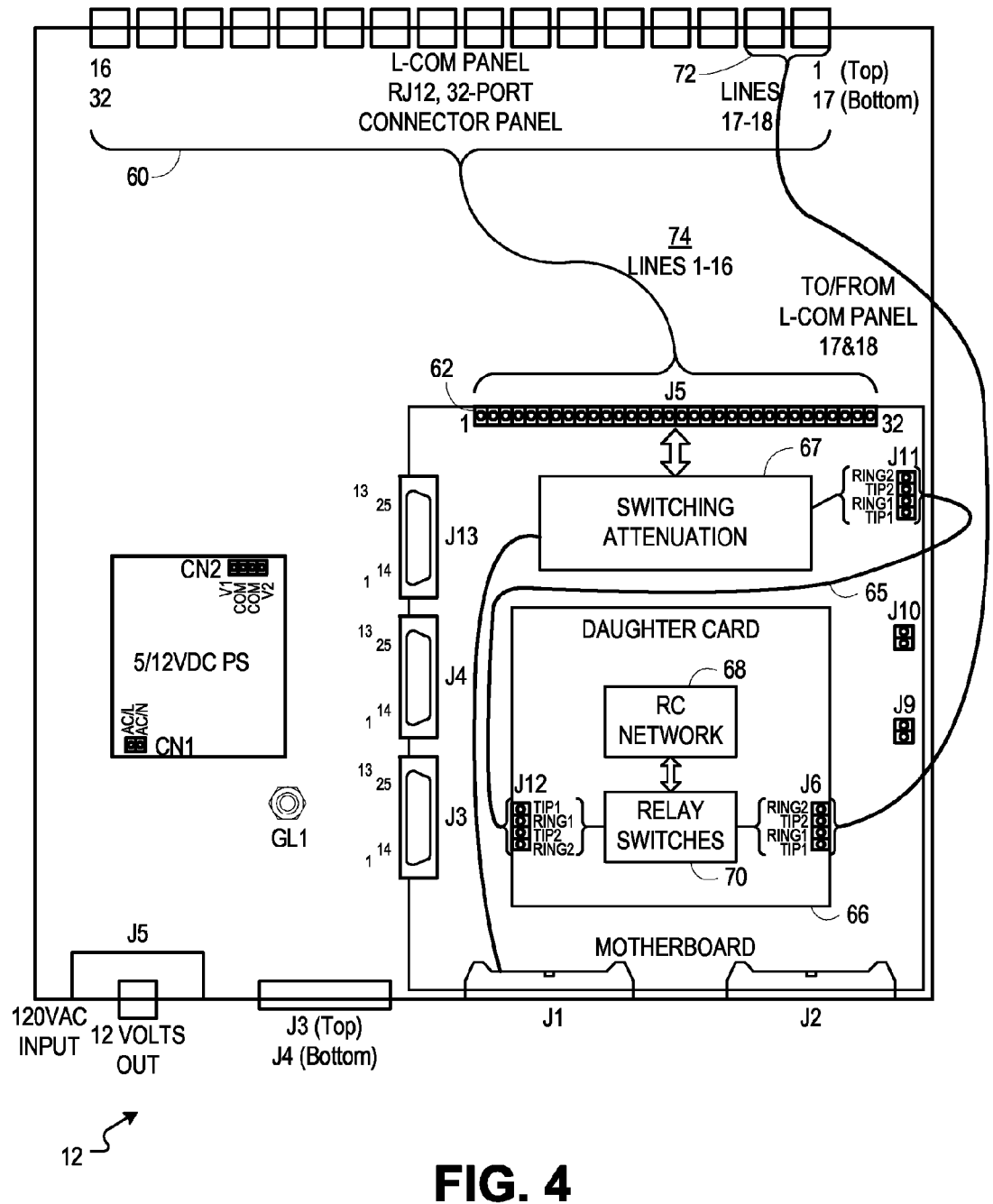
FIG. 4 illustrates a wiring and layout diagram for line card interface equipment

Turning now to FIG. 4, the figure illustrates a wiring and layout diagram for line card interface equipment 12. Line card interface ports 60 connect to jumper connector 62 on mother board 64. Mother board 64 communicates via cable 65 with daughter card 66. Thus, line card interface ports 60 are coupled to connection point J12 through switching network 67. Load circuitry 68 can be selectively coupled with telephony devices, including dial-up modems, via switch 70 between interface ports 72, which connect to telephony devices, and line card interface ports 60, which couple to CPE devices being tested. If switch 70 is placed into contacts broken position, which is the position shown in the figure, then no load is placed in parallel with the telephony devices coupled to interface ports 72. If the contacts of switch 70 are made up, the extra ring load, which is simulated by the RC network 68, sometimes referred to in the art as REN LOAD, is coupled in parallel with telephony devices coupled to ports 72 to simulate a predetermined number of traditional telephony devices (i.e., devices that have physical bell ringers, for example) coupled thereto. Thus, the test system can determine whether CPE devices being tested can generate the current and voltage necessary to ring the predetermined number of telephony devices upon receiving an incoming call.

What is claimed is:

1. A system for testing a plurality of CPE devices, comprising:
   a hub device;
   a CMTS coupled to the hub device;
   a provisioning server device coupled to the hub device;
   a general purpose computer coupled to the hub device, wherein the CMTS is coupled to the general purpose computer via a direct connection;
   a network interface coupled to the general purpose computer device via a plurality of network connections, the network interface including a panel having a plurality of network connection ports coupled to network ports of the provisioning server;
   RF interface equipment for transmitting and receiving CPE-side RF ports to and from RF ports of the plurality of CPE devices, wherein the RF interface equipment is coupled to the CMTS via upstream and downstream RF links; and
   line card interface equipment for interfacing with line card input/outputs of one or more of the plurality of CPE devices, wherein the line card interface equipment is connected to the RF interface equipment via a first digital connection and to the general purpose computer via a second digital connection.

2. The system of claim 1 wherein the system components claimed in claim 1 are mounted in a rigid mounting system.

3. The system of claim 2 wherein the rigid mounting system is a rack mount system.

4. The system of claim 1 further comprising a video display for displaying a user interface operated by the general purpose computer.

5. The system of claim 1 wherein the RF interface equipment includes variable attenuators coupled between the upstream and downstream links and the CPE-side RF ports, wherein the attenuators have variable attenuation factors that can be varied in response to signals received from the provisioning server device via the second digital connection and the first digital connection.

6. The system of claim 1 wherein the RF interface equipment includes variable attenuators coupled between the upstream and downstream links and the CPE-side RF ports, wherein the attenuators have variable attenuation factors that can be varied in response to control signals that are based on predetermined values corresponding to the CPE devices of various vendors.

7. The system of claim 1 wherein the general purpose computer include a dial-up modem for use in coupling to the line card equipment to simulate a user's telephony device coupled to one of the CPE devices being tested.

8. The system of claim 1 further comprising power supply equipment for providing power to the one or more of the plurality of CPE devices being tested.

9. The system of claim 8 further comprising a variac device for providing adjustable power to the plurality of CPE devices being tested to similar various household current scenarios.

10. The system of claim 8 wherein the power supply equipment includes a separate circuit breaker device for regulating power supplied to each of the CPE devices being tested.

11. The system of claim 1 wherein the line card equipment interface includes a simulated load that can be coupled with a telephony device to simulate the load imposed by a plurality of multiple telephony devices.

12. The system of claim 4 further comprising a switch device to for connecting the video display device to either a video output of the general purpose computer or a to a video output of the provisioning server device.

13. The system of claim 1 wherein the hub device is an IP router.

14. The system of claim 1 wherein the hub device is an IP switch.

15. A system for testing one or more CPE devices, comprising:
   a hub device;
   a CMTS coupled to the hub device;
   a provisioning server device coupled to the hub device;
   a general purpose computer coupled to the hub device, wherein the CMTS is coupled to the general purpose computer via a direct connection;
   a network interface coupled to the general purpose computer via a plurality of network connections, the network interface including a panel having a plurality of network connection ports coupled to network ports of the provisioning server;
   RF interface equipment for transmitting and receiving CPE.side RF ports to and from RF ports of the one or more CPE devices, wherein the RF interface equipment is coupled to the, CMTS via upstream and downstream RF links and wherein the RF interface equipment includes a panel having a plurality of RF communications ports for connecting to a plurality of RF communications ports on the one or more corresponding CPE devices and wherein the RF interface equipment includes a splitter network for coupling the one or more CPE devices coupled to one or more of the plurality of RF communications ports to upstream and downstream links; and
   line card interface equipment for interfacing with line card input/outputs of one or more of the one or more CPE devices, wherein the line card interface equipment is connected to the RF interface equipment via a first digital connection and to the general purpose computer via a second digital connection and wherein the line card interface equipment includes a panel having a plurality of line card interface ports for coupling line card interface ports of the one or more CPE devices to at least one line interface port having a telephony device coupled thereto.

16. The system of claim 15 further comprising power supply equipment for providing power to the one or more of the plurality of CPE devices being tested.

17. The system of claim 16 further comprising a variac device for providing adjustable power to the plurality of CPE devices being tested to similar various household current scenarios.

18. The system of claim 15 wherein a rigid mounting system locates components claimed in claim 15.

19. The system of claim 18 wherein the rigid mounting system is a rack mount system.

20. The system of claim 18 wherein the rigid mounting system meets safety standards.

21. The system of claim 20 wherein the safety standards include UL and CE specifications.

22. The system of claim 15 wherein the LC interface equipment includes circuitry for simulating a load of a predetermined number of telephony devices if the simulated load circuitry is coupled to a CPE device being tested.

* * * * *